United States Patent [19]

Dragotinov et al.

[11] 4,074,080

[45] Feb. 14, 1978

[54] METHOD AND SWITCHING ARRANGEMENT FOR SYNCHRONIZING OSCILLATORS OF A DIGITAL TELECOMMUNICATION NETWORK

[75] Inventors: Alexander Dragotinov, Munich; Harro Lothar Hartmann, Braunschweig, both of Germany

[73] Assignee: Siemens Aktiengesellschaft, Munich, Germany

[21] Appl. No.: 691,137

[22] Filed: May 28, 1976

[30] Foreign Application Priority Data

May 28, 1975 Germany .......................... 2523734

[51] Int. Cl.[2] ............................................ H04L 7/00
[52] U.S. Cl. ...................................... 178/69.1; 178/53
[58] Field of Search ........................ 178/53, 69.1; 179/15 BS; 325/58; 328/55, 63; 331/1 A, 2, 1 B

[56] References Cited

U.S. PATENT DOCUMENTS

| | | | |
|---|---|---|---|
| 3,109,897 | 11/1963 | Carbrey | 178/53 X |
| 3,424,864 | 1/1969 | Williams | 178/69.1 |
| 3,560,869 | 2/1971 | Miller | 178/69.1 |

Primary Examiner—Benedict V. Safourek
Attorney, Agent, or Firm—Schuyler, Birch, Swindler, McKie & Beckett

[57] ABSTRACT

A method and apparatus are described synchronizing oscillators at the network junctions in a pulse code modulation (PCM), time division multiplex (TDM) telecommunication network. In each network node pulse trains of clock pulses are received via incoming lines, and corresponding clock pulse trains are produced in the network node in accordance with the node's clock frequency division factor. The received and locally produced pulse trains are phase-compared, and a control signal resulting from the comparison is used to control the frequency of the clock oscillator in the network node. In each network node of a first network which has a direct line connection to a network node in a second network a phase comparison takes place between the two networks, and the result of the latter comparison is compared with the result of an intra-network comparison. The result of the latter comparison is used to adjust the line clock frequency of a given network.

8 Claims, 3 Drawing Figures

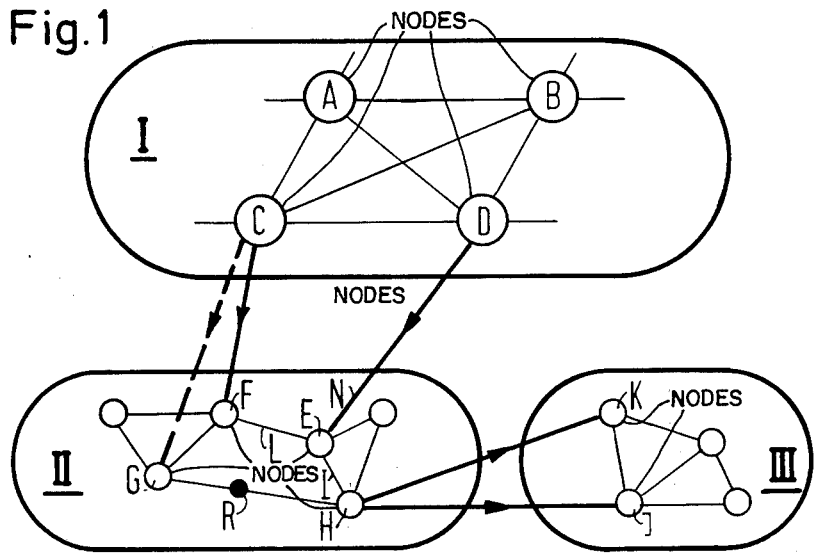
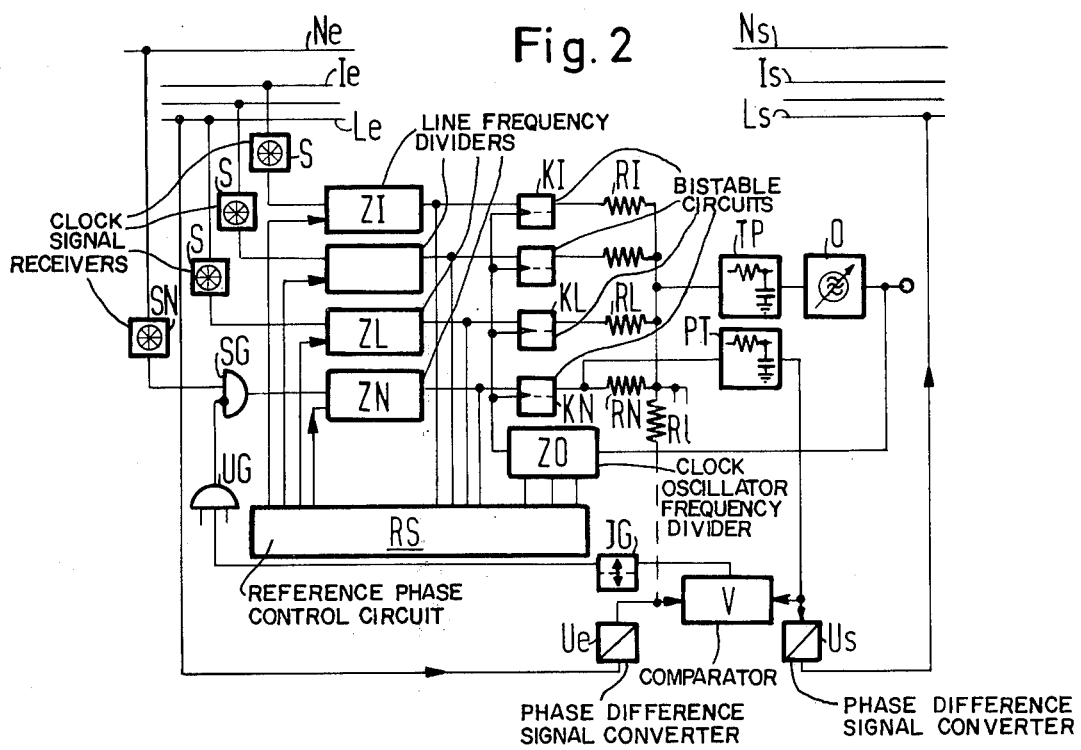

METHOD AND SWITCHING ARRANGEMENT FOR SYNCHRONIZING OSCILLATORS OF A DIGITAL TELECOMMUNICATION NETWORK

BACKGROUND OF THE INVENTION

Digital telecommunication networks, more particularly, pulse code modulation (PCM) time division multiplex (TDM) telecommunication networks having clock pulse oscillators provided in the network nodes thereof, e.g., in switching centers, have the function of compensating differences in bit frequencies between signals transmitted on various digital circuits leading to a network node. Such compensation is a prerequisite for correct switching of telecommunication circuits in the telecommunication central offices of such a digital network. Various principles underlying a solution are known for such a compensation of differences between bit frequencies (Proc. IEE, 113 (1966) 9, 1420 ... 1428, 1421; "Reports on Telephone Engineering", Siemens A. G., 5 (1969) 1, 48 ... 59).

In asynchronous operation (heterochronous operation) each PCM/TDM central office of a PCM/TDM telecommunication network has a special independent clock generator. Each central office receives time division line ends in a pulse-frame storage, the storage capacity of which corresponds to the number of bits per pulse frame and in which the binary words received are retained until they fit into the pulse frame of the PCM/TDM central office involved (at the same time the pulse-frame storage carries out a frame compensation).

In quasi-synchronous operation (using dummy bits), the PCM/TDM central offices of a PCM/TDM network have their own independent clock generators, but the information bit frequency, i.e., the mean number of information bearing bits per second is made equal for all PCM time-division multiplex central offices of the whole network. This is accomplished by compensating for the difference between the bit clock frequencies of the individual PCM/TDM central offices and the uniform information bit frequency through the insertion of dummy bits.

In servosynchronous operation (homochronous operation or master-slave operation), a central clock generator determines the bit frequency of the individual PCM/TDM central offices of a PCM/TDM telecommunication network.

Finally, in autosynchronous operation the individual PCM/TDM central offices have individual clock generators which, however, are not independent of one another, but lock on to one another, for example, in accordance with the phase averaging principle.

For the aforementioned form of operation, it is old and well known in the art to allocate in the individual central offices of a PCM/TDM telecommunication network, to the TDM lines incoming therein, phase discriminators which receive and compare a pulse train corresponding to the respective incoming line clock pulse frequency, as well as a pulse train corresponding to the office clock frequency of the respective central office. The output signals from the phase discriminators correspond to the respective phase shift between the respective line clock pulses and the office clock pulses; the output signals are combined in a sum or average-determining element to produce a control signal for controlling the frequency of the respective central office clock oscillator. Phase shifts may be caused by different clock frequencies of the clock oscillators provided in the individual central offices of the telecommunication network and/or by variations in them.

It is a known practice (cf. Electronics and Communications in Japan, 49 (1966) 11, 165) to employ a pulse train corresponding to the respective line clock bits or the central office clock bits and having a pulse repetition rate representing a submultiple of the clock bit frequency. This may be effected such that in the individual central offices of a PCM/TDM telecommunication network from the incoming PCM/TDM lines the line clock bits of the individual incoming PCM/TDM lines are extracted by means of flywheel circuits from the received PCM signals, whose phase shifts relative to the office clock bits of the central office involved cause the control of the clock oscillator supplying the central office clock bits. Incoming line clock bits and central office clock bits are routed to two frequency dividers starting the frequency division and are spaced preferably at 180° relative to each other (regeneration of the reference phase). A phase comparison between the frequency divider output pulse trains is carried out by means of a bistable circuit. The DC average of the output signal of the bistable circuit is proportional to the phase difference and, thus, proportional to the integral of a frequency difference, viz. the difference between line clock frequency and the central office frequency.

The output signals of all bistable circuits allocated to individual lines are added by means of resistances for averaging and smoothed by a RC network. The capacitor voltage from the RC network regulates the clock frequency of the central office oscillator by varying the capacitance of a capacitance diode.

The reset pulses from the central office oscillator frequency divider act on the counting inputs of the individual bistable circuits allocated to the two bistable circuit fields; if a line clock bit signal breaks down, the associated bistable circuit runs as a counter having a duty cycle ratio of 1:1. This leads to a control voltage equal to an agreement between line clock frequency and central office clock frequency.

Two or more of the above principles may also be applied simultaneously. Thus, it is well known (U.S. Pat. No. 3,684,837) that in the individual network levels of a multi-level telecommunication network or in the individual networks of a telecommunication network comprising two or more networks there is mutual synchronization of the clock oscillators in the autosynchronous mode, while a controlled synchronization in the servosynchronous mode is provided between the network levels or between the individual communication networks over two or more lines.

With directed synchronization of a digital telecommunication network, through an additional network, it is desirable that such synchronization be effected without restrictions, as far as the network configuration is concerned, particularly with a view to increasing the number of communication lines linking the communication networks together or, where applicable, merely serving the clock pulse transmission. However, insertion of additional communication lines between a given digital telecommunication network and other such networks does not lead, without special provision, to an improvement of the synchronizing effect on the network to be synchronized from the additional network. Instead, it may lead to an undesirable momentary frequency variation within the communication network.

The aforementioned variation may be prevented (U.S. Pat. No. 3,684,387) by causing the frequency division effected for obtaining a pulse train corresponding to the line clock bit of the inserted communication line in accordance with a frequency division factor to start with the above mentioned spacing at 180° relative to the frequency divider of the central office clock oscillator in question. However, a synchronizing influence on the digital communication network to be synchronized is exerted, at least for the time being, as before, only over the existing line or lines between the synchronizing additional communication network and the digital communication network to be synchronized due to the phase difference or differences prevailing therein between the pulse train corresponding to the respective line clock bit rate and the pulse train corresponding to the respective line clock bit rate and the pulse train corresponding to the respective office clock bit rate. The newly inserted communication line remains without effect for the time being, due to the 180° phase difference. Subsequently, the network being synchronized can be so synchronized using a smaller control range than would otherwise be necessary, since it is not very likely that the phase discriminators of all communication lines extending from the synchronizing additional communication network to the digital communication network to be synchronized operate in at least substantially identical operating points. It can, therefore, concurrently be driven to full output. However, such a small frequency control range may be inadequate if there is a large no-load line frequency difference between the non-externally synchronized digital communication network and the additional communication network.

An object of the invention is, therefore, to provide a mean and method for removing the restrictions enumerated above and to provide for the efficient synchronization of a digital communication network.

Another object of the invention is to provide means and method for the aforementioned synchronization using one or more additional communication line or lines, by means of an extra communication network connected to said digital communication network over one or more communication lines.

SUMMARY OF THE INVENTION

The aforementioned and other objects are achieved in a means and method of synchronizing oscillators of a digital communication network, more particularly a PCM/TDM communication network, with oscillators at network node's or switching centers locking on to one another through one or more oscillators of an additional communication network. In each network node of the digital communication network pulse trains corresponding to line clock bits of the digital communication lines incoming in the network node are produced to have a pulse repetition frequency proportional to a clock frequency division factor. A pulse train corresponding to the clock frequency of the relevant network node is produced in accordance with the clock frequency division factor. These pulse trains are subjected in phase discriminators connected to the individual digital communication lines to phase comparisons between the pulse train corresponding to the respective line clock pulses and the pulse train corresponding to the central office clock pulses. A frequency control signal for the frequency regulation of the central office oscillator is generated from the thusly obtained pulse difference signals.

In accordance with the principles of the invention, in each network node of the digital communication network, to which a direct communication line runs from a network node of an additional communication network, the phase difference ascertained during the phase comparison between the pulse train corresponding to the line clock rate of the incoming communication line and the pulse train corresponding to the central office clock rate is compared with phase differences ascertained in like fashion between the pulse train corresponding to the line clock rate of the relevant direct communication line and the pulse train corresponding to the relevant central office clock rate in the other network node's of the digital communication network to which such a direct communication line likewise extends.

A phase difference exceeding each of the phase differences compared therewith and ascertained in the other network nodes involved is lowered by an effective and, where appropriate, repeated increase between two successive pulses of the pulse train corresponding to the line clock bit rate of the relevant direct communication line, of only the frequency division factor relevant to the communication line and relative to the frequency division factors relevant to the direct communication lines leading to the other network nodes.

The invention can be applied both to single-ended synchronized and double-ended synchronized digital communication networks. It has the advantage that after insertion of additional communication lines between the digital communication network to be synchronized and the synchronizing additional communication network which, where appropriate, may also consist of only one network nodes or only one oscillator, the phase differences causing the frequency regulation between the pulse train corresponding to the line clock rate of the relevant direct communication line and the pulse train corresponding to the central office clock rate of the relevant network node of the digital communication network are evenly distributed to all network nodes of the digital communication network. Thus, the phase discriminators involved operate in at least substantially identical working points.

The result of this mode of operation is an appropriate redundancy in the frequency control of the digital communication network by the additional communication network. A further result is a markedly increased frequency control range proportional to the number of the direct communication lines in which the additional communication network is capable of controlling the digital communication network in its trunk frequency with which at the same time a decrease of an otherwise possible tuning area of period fading and frequency pulling is connected.

In a further development of the invention, the phase difference signals in other network nodes of the digital communication network obtained in network nodes of the digital communication network to which a direct communication line extends from the additional communication network during the phase comparison between the pulse train corresponding to the line clock rate of the communication line and the pulse train corresponding to the central office clock rate may also be included directly in the sum or mean-value determining unit. This results in generation of the frequency control signal of the relevant central office clock oscillators, and an additional expansion of the frequency control range of the digital communication network.

The phase difference signals obtained during a phase comparison between the pulse train corresponding to the line clock bit rate of a communication line extending from the additional communication network and the pulse train corresponding to the respective central office clock bit rate may, since such signals (in contradistinction with, for example, double-ended synchronizing signals) need be transmitted fairly infrequently, in a further development of the invention, are conveniently transmitted in pulse code form in a PCM/TDM communication network in otherwise free time elements of a synchro or signal time slot.

In order to increase the frequency divider factor, as mentioned hereinabove, one input of a comparator may conveniently be connected to the output of a phase discriminator of a network node of the digital communication network; this phase discriminator is associated with a communication line extending from the other communication network to the network node. The appropriately ascertained phase difference signals of a phase discriminator of another network node are routed to the other input of said comparator. The latter phase discriminator is associated with another communication line extending from the other communication network to another network node of the digital communication network. The output of the comparator leads to the inhibiting input of a blocking element preceding the frequency divider which, in turn, precedes the first-mentioned phase discriminator. Where appropriate, an AND element may be inserted between the output of the comparator and the inhibiting input of the blocking element. The outputs of other such comparators are energized from other network nodes with phase difference signals extending to other inputs of the AND element.

BRIEF DESCRIPTION OF THE DRAWINGS

The principles of the invention will be more readily understood by reference to the following detailed description of a preferred embodiment and the drawings which are briefly described as follows.

FIG. 1 is a schematic diagram of a communication system comprising two or more communication networks (I-III). Network I shows nodes A, B, C, . . . ; network II shows nodes E, F, G, . . . ; network III shows nodes J, K, . . . .

FIG. 2 is a schematic diagram of a preferred embodiment of a synchronizing circuit in a network junction constructed in accordance with the principles of the invention.

DETAILED DESCRIPTION OF A PREFERRED EMBODIMENT

Figure 3:
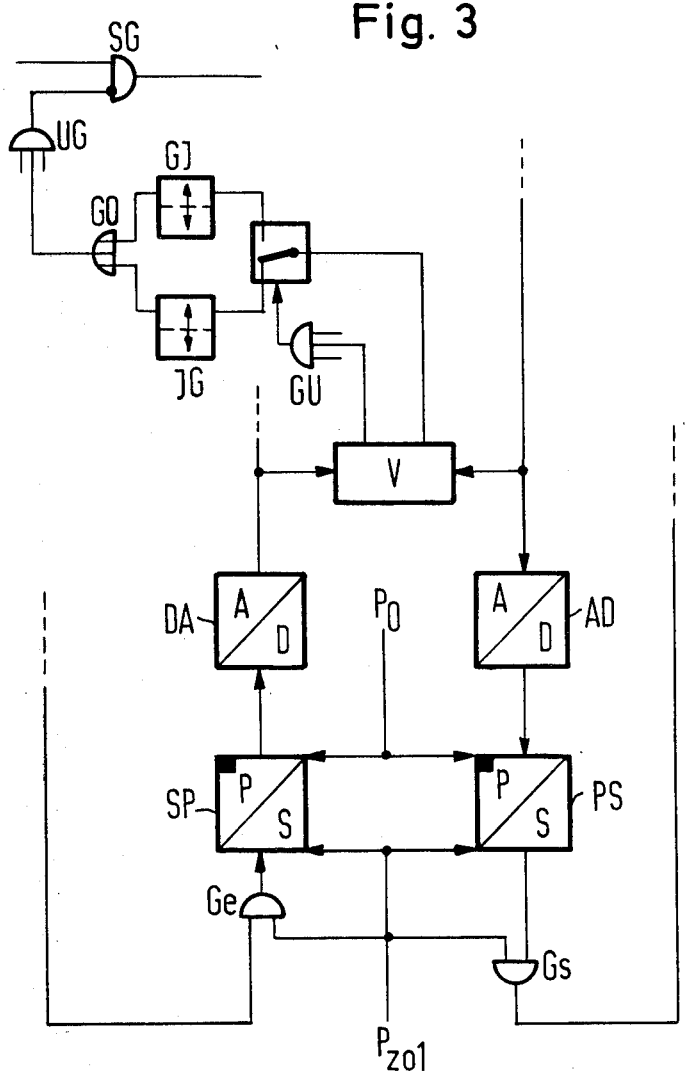
FIG. 3 is a more detailed schematic view of a portion of the FIG. 2 synchronizing circuit.

FIG. 1 shows a communication system comprising three communication networks I, II, and III. Communication network II may be a digital communication network, more particularly a PCM/TDM communication network having oscillators in the network nodes E, F, G, H, R . . . locking on to one another. In each network node, e.g., in network node E, pulse trains corresponding to line clock bit rates of digital communication lines incoming to the network junction (in the example, the communication lines I, L, N) are generated in proportion to a clock frequency division factor. A pulse train corresponding to the central office clock bit rate of the relevant network node (E) is generated in proportion with the clock frequency division factor. Phase discriminators connected, respectively, to individual digital communication lines perform phase comparisons between the pulse trains corresponding to the respective line clock bit rates and the pulse train corresponding to the central office clock bit rate in the network node in question. A frequency control signal is generated for the frequency regulation of the central office clock oscillator in the network node from the thusly obtained phase difference signals through combination over a sum or mean-value determining unit.

Reference is made to the schematic diagram of a preferred embodiment of a synchronizing circuit shown in FIG. 2. This circuit operates in accordance with the phase averaging principle. This synchronizing circuit is contained, for example, in a central office of a PCM/TDM telecommunication network having other such central offices, and it includes a central office oscillator O which is to be synchronized in accordance with the phase averaging principle by means of the corresponding oscillators of the other central offices via the time division multiplex lines Ie . . . Le running from the other central offices. This principles and the apparatus for carrying it out are fully described in U.S. Pat. No. 3,859,466, Nachrichtechische Zeitschrift 21 (1968) 9, 533, FIG. 2 and 534, FIG. 3, and Nachrichtechnische Zeitschrift 23 (1970) 5, 257, FIG. 1.

The incoming time division multiplex lines (receive time division multiplex lines) Ie . . . Le carry the communication signal transmission proper, and the line clock pulses emanating from the oscillators provided in the other similarly constructed central offices are extracted by means of clock signal receivers S. Such a clock signal receiver includes a clock generator and a phase discriminator controlling it, which correlates the signal elements "1" occurring on the incoming time division multiplex line with the clock generator, as well as with the inverted clock generator signals and controls with gating signals the charging or discharging of a capacitor. The clock generator is then readjusted, as far as its clock phase is concerned to the mean phase relation of the received PCM signal elements in accordance with the state of the capacitor.

The thusly obtained line clock bits are coupled to line frequency dividers ZI . . . ZL. Phase comparators in the form of bistable circuits KI . . . KL are, respectively assigned to each incoming line, connected to an output of a respective frequency divider. In addition, another input of each of the coupled bistable circuits KI . . . KL is connected to a counting input to the output of a clock oscillator frequency divider ZO connected to the output of the central office clock oscillator O. The DC means value of the output signal of each bistable circuit KI . . . KL is thus (in a periodic function) proportional to the phase difference between the line clock pulse signal and the central office clock signal.

The output signals of the bistable circuits KI . . . KL are combined in an analog adder made up of resistors RI . . . RL. A low-pass filter TP receives the analog adder output and produces a control signal coupled to a control input of the clock oscillator O, the frequency of which is to be controlled.

The line frequency dividers ZI . . . ZL are constructed and operate in a manner known from the prior art, after a possible regeneration of the reference phase and spaced in time at about 180° relative to the clock oscillator frequency divider ZO. Such a regeneration of the reference phase may be triggered by means of an appropriate reference phase control circuit RS (FIG. 2) when there is a frequency drift from the no-load frequency of the oscillators exceeding a prescribed limiting value in accordance with the minimum number of phase comparators allocated to individual lines and operating in a network node, and/or when during the phase comparison upon which the frequency control is based a prescribed limiting value of the phase difference is exceeded, with which at the same time the maximum output signal of a phase comparator is connected. Circuits controlling the reference phase in this manner are old and fully described in, for example, U.S. application No. 581,376, now U.S. Pat. No. 4,002,839.

Referring back to FIG. 1, the network junctions E and F of the digital communication network II shown therein are connected by two direct communication lines to the network nodes D or C of another communication network I having additional network nodes A, B. In the network nodes of the communication network I there may likewise be provided clock oscillators locking on to one another and, where appropriate, having in a manner known from the prior art, a higher degree of frequency accuracy than the interlocking clock oscillators of the digital communication network II. This makes it desirable for a synchronizing effect to be exerted from the clock oscillators contained in the network nodes C and D on the clock oscillators contained in the network nodes F and E. This is shown in FIG. 1 by appropriately directed arrows in the communication lines N and C-F interconnecting the network nodes considered. These communication lines may be lines that are already provided for communication between the network nodes under consideration. However, it is also possible that a communication line serving only for synchronization is provided between two network nodes. This is shown in FIG. 1 by the dotted line between the network junctions C and G.

In addition to the digital communication network II there is provided in the communication system of FIG. 1 a communication network III having interlocking oscillators provided in the network nodes thereof, and it is apparent from FIG. 1 that two network nodes J and K of this communication network III are synchronized from the network node H of the digital communication network II.

In principle, the synchronization of a network node of a communication network from a network node of another communication network takes place in the same manner as the synchronization of a network node by another network of the same communication network, as described above. Accordingly, in the switching arrangement of FIG. 2 there is connected to a receive time division multiplex line Ne which, as shown in FIG. 1, may, for example, extend from the network node D of the communication network I to the network E of the digital communication network II, a clock signal receiver extractor SN in the network node leading to a line frequency divider ZN. A phase comparator allocated to this line and in the form of a bistable circuit KN has an input coupled to the divider ZN. In addition, bistable circuit KN is connected by a counting input to the output of the clock oscillator frequency divider ZO. The output signals of the bistable circuit KN are connected via a resistance RN to the analog adder mentioned above for the sum and mean-value determination and, thus, for the generation of the frequency control signal for the clock oscillator O of the network node E.

In similar fashion, another network node of the digital communication network II may also be constructed for synchronization from a network node of the other communication network. FIG. 1 shows such a synchronization of the network node F from the network node C. In order to obtain in both network nodes E and F of the digital communication network II substantially equal phase differences between the line clock pulses prevailing on the relevant communication line (N or C-F) and the central office clock frequency of the network node (E or F) involved, a comparison is now made in both network nodes E and F of the digital communication network II between the phase difference ascertained during the phase comparison between the pulse train corresponding to the line clock pulse rate of the respective communication line (N or C-F) and the pulse train corresponding to the relevant central office clock frequency, and the phase difference ascertained in like manner in the other network node (F or E) involved. For this purpose, there is connected in the switching arrangement of FIG. 2 to the output of the phase discriminator KN of the network node (E in FIG. 1) associated with a communication line N extending from the other communication network (I in FIG. 1) one input of a comparator V, by means of low-pass filter PT. The other input of comparator V receives the phase difference signals of the phase discriminator of the other network node (F in FIG. 1) of the digital communication network in question (II in FIG. 1). To achieve this, the other input of the comparator V is connected via a phase difference signal converter Ue to the receive time division multiplex line Le which, under the conditions shown in FIG. 1, extends from the other network node F to the network node E under consideration. This connection carries the phase difference signals obtained during a phase comparison between the pulse train corresponding to the line clock pulse of the communication line (C-F in FIG. 1) extending from the other communication network (I in FIG. 1) to the relevant network node (F in FIG. 1). The pulse train corresponding to the relevant central office clock oscillator may be transmitted in pulse-code form in otherwise free time elements of a synchro or signal time slot to the network node E.

In like manner, the phase difference signals supplied from phase discriminator KN are transmitted to the network node F, for which, in the switching arrangement of FIG. 2, the output of the low-pass filter PT connecting the phase discriminator KN to one input of the comparator V is connected via a signal converter Us to the send time division multiplex line Ls. Line Ls (FIG. 1) extends from the network node E to the network node F.

As detailed in FIG. 3, the send side phase difference signal converter Us has an analog-digital converter AD connected on the input side to one input of the comparator V followed by a parallel-serial converter PS, the output of which is connected via a send gate circuit Gs to the send time division multiplex line Ls (FIG. 2). As shown in FIG. 3, the receive side phase difference signal converter Ue is connected on the input side via a receive gate circuit to a serial-parallel converter SP connected to the receive time division multiplex line Le (FIG. 2). The serial-parallel converter SP is followed by a digital-analog converter DA, the output of which leads to the other input of the comparator V.

Assuming that the phase difference signals are transmitted bit by bit in pulse-code form of 8-bit words in the first time element of the synchro time element of every second pulse frame of the PCM system, which for each phase difference signal word takes place in the course of 16 pulse frames, thereby producing a governing pulse, the signal transmission from analog-digital converter AD to parallel-serial converter PS, as well as from serial-parallel converter SP to digital-analog converter DA, may take place with a governing pulse at the start or end thereof. This is shown in FIG. 3 with a control lead $p_0$ carrying appropriate governing pulses and leading to the input of the parallel-serial converter PS or to the output of the serial-parallel converter SP. The signal transmission from the output of the parallel-serial converter PS via the send gate circuit Gs to the send time division multiplex line Ls (FIG. 2) and that from the receive time division multiplex line Le (FIG. 2) via the receive gate circuit Ge to the input of the serial-parallel converter SP may take place in every first time element of the synchro time element of each second pulse frame. In FIG. 3, this is shown by a control lead $p_{zol}$ carrying appropriate time element pulses and leading to the control inputs of the gate circuits Gs and Ge, as well as to the output of the parallel-serial converter PS and to the input of the serial-parallel converter SP.

When comparing the phase difference signals fed to the comparator V, the latter emits an output signal whenever the phase difference signal of the separate network node (E in FIG. 1) emanating from the phase discriminator KN is larger than the phase difference signal of the additional network node concerned (F in FIG. 1) transmitted over the time division multiplex receive line Le. A comparison output signal activates a disable-pulse generator JG, which causes a momentary blocking of a blocking element SG inserted between the clock signal receiver SN and the line frequency divider ZN, so that a line clock pulse of the communication line N running from the additional communication network (I in FIG. 1) to the network node E under consideration of the digital communication network (II in FIG. 1) is suppressed. Thus, as a result, the frequency division factor of the clock frequency divider ZN relevant to this communication line N is correspondingly increased.

As shown in FIG. 2, the disable-pulse generator JG may be formed by an astable circuit inserted between comparator output and inhibiting input. The astable circuit is designed such that with a continuous comparator output signal the pulse inhibition of the line clock signal and, thus, the increase of the frequency division factor, is repeated at a repetition rate $f_w$ which is larger than the maximum frequency difference between the (no-load) line frequency of the (non-externally synchronized) digital communication network (II in FIG. 1) and the line frequency of the additional communication network (I in FIG. 1) and/or smaller than the reciprocal value of the control line time constant $\tau$ of the digital communication network.

The increase of the clock frequency division factor relevant to the communication line N and caused, where appropriate, by a repeated pulse inhibition results in a corresponding decrease in the phase difference between the pulse train corresponding to the communication line clock occurring at the output of the line frequency divider ZN and the pulse train corresponding to the clock oscillator and occurring at the output of the frequency divider ZO. Thus, if necessary, after repeated pulse inhibition the relevant phase difference of the network node E will be smaller than the corresponding phase difference of the network node F, and there is no further pulse inhibition in the network node E. If, with an appropriately high threshold of response of the comparator, even in the network node F, the corresponding comparator therein does not emit an output signal, the system formed by the two network nodes comes to a standstill. It is also possible, however, that, with a correspondingly low threshold of response, a pulse inhibition takes place in the network node F. In the latter case the system formed by the two network nodes E and F oscillates the predetermined reference point.

If the digital communication network (II in FIG. 1) has two or more network nodes, in which it is servosynchronized directly from the additional communication network (I in FIG. 1), then, if necessary, in each of these network nodes a separate phase difference signal comparator circuit, as shown in FIG. 2, must be provided for each of the other network nodes. In FIG. 2 is shown that, where necessary, there is inserted between the output of the comparator V and the inhibiting input of the blocking element SG an AND element UG, to the other inputs of which lead the outputs of additional comparators energized with appropriate phase difference signals of other network nodes. Thus, it is achieved that only a phase difference exceeding each of the phase differences compared therewith and ascertained in the other input network nodes concerned is reduced by a time-limited effective (if necessary, repeated) increase of only the frequency division factor relevant to this communication line between two successive pulses of the pulse train corresponding to the line clock rate of the direct communication line involved. This ensures at all times unambiguous conditions in the network node system.

The dash-dotted line in FIG. 2 indicates that one may likewise include directly in the sum or mean-value determination for generating the frequency control signal of the clock oscillator O of network junction (e.g., E in FIG. 1) of the digital communication network (II in FIG. 1) the phase difference signals obtained in another network node (F in FIG. 1) during the phase comparison therein between the pulse train corresponding to the line clock rate of a communication line (C-F in FIG. 1) leading directly thereto and the pulse train corresponding to the central office clock oscillator therein. To achieve this, the output of the receive-side phase difference signal converter Ue is connected to a resistance R1 included in the analog adder. In this way, one may exert from the additional communication network (I in FIG. 1) a synchronizing action on the network node (E in FIG. 1) just considered of the digital communication network (II in FIG. 1).

It should be noted that in a further development of the invention, when a sufficiently even distribution (i.e., sufficient equality) of the phase differences occuring in the network nodes E, F, G (see FIG. 1) of the digital communication network II between the pulse trains corresponding to the line clock signals of the input communication lines N, C-F, C-G emanating directly from the additional communication network I and the pulse trains corresponding to the clock oscillators involved to all input network nodes E, F, G of the digital communication network II is achieved, the repetition rate at which a pulse inhibition may occur may be decreased by one or two orders of magnitude. As a result, the accuracy with which the line frequency of the digital communication network II agrees with that of the digital communication network I is increased accordingly. Where appropriate, the pulse inhibition may even be made completely ineffective. This may be achieved in the switching arrangement of FIGS. 2 or 3, for example, by means of a switch which interrupts the connection leading to the inhibiting input of the blocking element SG.

The decrease of the repetition rate may be effected via a cut-over switch which enables, instead of the disable-pulse generator JG, a suitably slower disable-pulse generator. Such a construction of a synchronizing circuit working in accordance with the teachings of the invention is shown in FIG. 3. The two disable-pulse generators formed, for example, by astable circuits of different designs are marked JG and GJ. On the output side, the two disable-pulse generators run over an OR element GO to the AND element UG, likewise shown in FIG. 2, or directly to the inhibiting input of the blocking element SG. The enabling of one or the other of the disable-pulse generator takes place from a corresponding output of the comparator V, which emits an output signal only when the phase difference signals fed to the comparator V are (at least substantially) equal. The output signal also is coupled via an AND element GU if two or more phase difference signal comparator circuits are provided.

While there is a detailed description of a preferred embodiment for carrying out the principles of the invention described above, the described embodiment is to be considered only as being exemplary. The described embodiment can be modified or changed in ways known to those skilled in the art, while remaining within the scope of the invention, as defined by the appended claims.

We claim:

1. A method of synchronizing clock oscillators in the network nodes of a first digital communication network utilizing at least one clock oscillator in a second digital communication network, comprising the steps of:

comparing, in each network node, the phases of first line clock pulse trains on incoming lines to that network node from other network nodes in said first network with clock pulse trains issuing from a clock oscillator in the network node and producing first phase difference signals having a value proportional to the phase difference between said first line clock pulse trains and said clock oscillator pulse trains, receiving second line clock pulse trains from at least one network node of said second network, comparing the phases of said second line clock pulse trains and said clock oscillator pulse trains in the network node and producing a second phase difference signal having a value proportional to the result of the comparison, receiving from another network node in said first network a third phase difference signal produced in the other network node in like manner as said second phase difference signal, generating a comparison output signal whenever the value of said second phase difference signal exceeds the value of said third phase difference signal, suppressing a number of pulses in said second line clock pulse train in proportion to the value of said compression output signal and sufficient to reduce the value of said second phase difference signal to be equal to or less than said third phase difference signal, producing a control signal which is one of the sum or average of said first and second phase difference signals and regulating the frequency of said clock oscillator responsive to the value of said control signal.

2. The method defined in claim 1 wherein said producing step comprises producing a control signal which is one of the sum or average of the values of said first, second and third phase difference signals.

3. The method defined in claim 1 comprising the additional step of:

transmitting said second phase difference signal in pulse code modulated form to others of the network nodes in said first network.

4. Apparatus for synchronizing clock oscillators in network nodes of a first digital communication network utilizing at least one clock oscillator in a second digital communication network, comprising:

clock oscillator in each network node, first phase comparator means in each network node for receiving first line clock pulse trains from other network nodes in said first network, for comparing them, respectively, with the output of said clock oscillator, and for producing first phase difference signals proportional in value, respectively, to the phase difference between each said first line clock pulse train and the output pulse train from said clock oscillator, clock pulse train and the output pulse train from said clock oscillator, second phase comparator means for receiving from at least one clock oscillator in said second network a second line clock pulse train, for comparing the phases of said second line clock pulse train and said clock oscillator output and for producing a second phase difference signal having a value proportional to the measured phase difference, means for receiving a third phase difference signal from another network node in said first network, said third phase difference signal being produced in the other network node in the same manner as said second phase difference signal, comparator means for comparing the values of said second and third phase difference signals and for producing an output signal when said second phase difference signal exceeds said third phase difference signal, inhibiting means for blocking the passage of pulses of said second line clock pulse train to said second phase comparator means responsive to said comparator output signal, the number of pulses suppressed being dependent on the value of said comparator output signal, said inhibiting means being operative until said second phase difference signal is equal to or less than said third phase difference signal, summing means for producing a control signal having a value proportional to one of the sume or mean of the values of said first and second phase difference signals and regulating means for adjusting the frequency of said clock oscillator responsive to the value of said control signal.

5. The apparatus defined in claim 4 further comprising:

AND gate means having an input connected to said comparator output and an output connected to said inhibiting means, and additional comparator means for comparing said second phase difference signal and other third phase difference signals from further network nodes, outputs of said additional comparators being connected to other inputs of said AND gate means.

6. The method defined in claim 1 wherein said suppressing step increases a frequency division factor relevant to said second line clock pulse trains.

7. The method defined in claim 6 wherein said frequency division factor is repeatedly increased at a repetition rate which is smaller than the reciprocal value of a control line time constant of said first network or is larger than a maximum line frequency difference between said first network operating at a no-load condition and said second network.

8. The method defined in claim 6 wherein said increase in the frequency division factor is repeatedly increased at a rate which is reduced by one or two orders of magnitude if said first, second and third phase difference signals are sufficiently equal.

* * * * *